United States Patent [19]

Kitchen et al.

[11] 3,987,006

[45] Oct. 19, 1976

[54] CARBON DIOXIDE AND EXCESS WATER TREATMENT OF POLYMER STABILIZED WITH PHOSPHITE AND GLYCINE

[75] Inventors: Alonzo G. Kitchen; Frank J. Szalla, both of Bartlesville, Okla.

[73] Assignee: Phillips Petroleum Company, Bartlesville, Okla.

[22] Filed: Aug. 14, 1975

[21] Appl. No.: 604,742

[52] U.S. Cl.................. 260/45.85 N; 260/45.95 D; 260/45.95 R
[51] Int. Cl.².................. C08K 3/20; C08K 5/52; C08K 5/16
[58] Field of Search............. 260/45.95 D, 45.85 N, 260/45.95 R

[56] References Cited
UNITED STATES PATENTS

| | | | |
|---|---|---|---|
| 2,135,641 | 11/1938 | Jacobson | 260/45.85 A |
| 3,335,108 | 8/1967 | Pines | 260/45.85 A |
| 3,412,064 | 11/1968 | Brindell | 260/45.95 D |
| 3,640,980 | 2/1972 | Baba | 260/80.7 |
| 3,801,520 | 4/1974 | Hogan et al. | 260/23.7 R |

OTHER PUBLICATIONS

Atmospheric Oxidation and Antioxidants–by Scott (1965) pp. 212 and 222.

Primary Examiner—V.P. Hoke

[57] ABSTRACT

The effluent from a lithium initiated polmerization, wherein a coupling agent is utilized to join two or more polymer molecules together, with the resulting generation of LiO—, LiS—, or

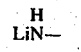

groups is treated with carbon dioxide and an excess of water and thereafter stabilized with an organic phosphite and a glycine in combination with a hindered phenol.

10 Claims, No Drawings

CARBON DIOXIDE AND EXCESS WATER TREATMENT OF POLYMER STABILIZED WITH PHOSPHITE AND GLYCINE

BACKGROUND OF THE INVENTION

This invention relates to treating coupled lithium initiated polymer to improve haze and stability of the resulting polymer.

Recently, polymer has been produced wherein lithium initiated polymer chains are contacted with a coupling agent to join two or more polymer molecules together. If the coupling agent contains three or more reactive sites, a radial polymer is formed with the separate polymer chains radiating out from the coupling agent nucleus. Production of such polymers is described in Zelinski et al. U.S. Pat. No. 3,281,383. A common problem in the production of such polymers, particularly resinous polymers, is the formation of an undesirable haze and a tendency of the polymer to exhibit drop off in melt flow during processing.

It is known to treat such polymers with carbon dioxide and water in order to improve stability and optical properties. This is disclosed in Hogan et al. U.S. Pat. No. 3,801,520.

SUMMARY OF THE INVENTION

It is an object of this invention to provide coupled polymer with improved optical properties;

It is a further object of this invention to provide a coupled polymer with improved thermal stability; and It is yet a further object of this invention to improve both optical properties and stability of coupled polymers.

In accordance with this invention, the effluent from a lithium initiated polymerization wherein the polymer molecules have been contacted with a coupling agent having at least two reactive sites, with the resultant generation of LiO—, LiS— or

groups, is treated with carbon dioxide and an excess of water and stabilized with an antioxidant system comprising a phosphite, a glycine, and a hindered phenol.

DESCRIPTION OF THE PREFERRED EMBODIMENTS

The polymers used in the practice of this invention are prepared by producing the polymer in the presence of an organolithium initiator to give polymer containing an active lithium atom on one end of the polymer chain as more fully described in said Zelinski et al. patent, the disclosure of which is hereby incorporated by reference. This lithium-terminated polymer is then reacted with a compound which has at least two, preferably at least three, reactive sites capable of reacting with the carbon-lithium bond and adding to the carbon possessing this bond in the polymer. The applicable coupling compounds will be discussed in greater detail hereinbelow. The result in the preferred embodiment wherein the coupling agent has at least three reactive sites, is a polymer having relatively long branches which radiate from a nucleus formed by the polyfunctional compound which reacted with the lithium-terminated polymer. The preferred organolithium compound comprises lithium attached to a hydrocarbon radical selected from the group consisting of aliphatic, cycloaliphatic, and aromatic radicals containing 1–20 carbon atoms, such as n-butyllithium.

The preferred polymers used in the practice of this invention are resinous polymers containing 70–95 weight percent polymerized monovinyl-substituted aromatic hydrocarbon monomer containing from about 8–18 carbon atoms per molecule and from about 30–5 weight percent polymerized conjugated diene monomer containing about 4–12 carbon atoms per molecule, said polymer having a melt flow in the range of about 0.5–200 grams per minute as described by ASTM D1238-65T, Condition G. More preferably, the polymer is produced by sequential addition of the monovinyl-substituted aromatic hydrocarbon monomer and the conjugated diene monomer so as to give what would be theorized to be a block copolymer. For example, polymer formed by means of the following sequential steps gives lithium terminated branches demonstrating a plurality of modes on a gel permeation chromatograph curve to form a polymer of a more preferred embodiment of the invention wherein the branched block copolymer chains radiating from the central nucleus are of varying length:

a. Contacting under polymerization conditions at a temperature up to about 250° F. a monovinyl-substituted aromatic hydrocarbon monomer containing from about 8–18 carbon atoms per molecule with an organolithium polymerization initiator containing from about 1–20 carbon atoms per molecule wherein said monovinyl-substituted aromatic hydrocarbon monomer is employed in an amount to provide from about 40–90 weight percent of the total monovinyl-substituted aromatic hydrocarbon employed in preparing said copolymer wherein said initiator is employed in an amount to provide from about 0.01–0.2 part by weight of initiator per 100 parts by weight of said monomer and continuing said contacting for a period of time sufficient to polymerize essentially all of said monovinyl-substituted aromatic hydrocarbon monomer;

b. Charging to the polymerization reaction product of step (a), in one or more increments, the remaining monovinyl-substituted aromatic hydrocarbon monomer representing from about 10–60 weight percent of said total monovinyl-substituted aromatic hydrocarbon monomer employed in preparing said copolymer, wherein for each incremental charge of monovinyl-substituted aromatic hydrocarbon monomer additional organolithium initiator is provided in an amount from about 0.1–1.5 parts by weight of said initiator per 100 parts by weight of said incremental charge of monomer, wherein after each monomer and initiator charge a sufficient contacting time is allowed to permit essentially complete polymerization of the newly added monomer, wherein the amount of initiator employed per 100 parts by weight of each incremental monomer charge of step (b) exceeds the amount of initiator employed in step (a) by at least 0.1 part of initiator per 100 parts of monomer by weight and wherein the total amount of said monovinyl-substituted aromatic hydrocarbon monomer employed in steps (a) and (b) comprises from about 70–95 weight percent of the total weight of said branched block copolymer based upon the total weight of all of the monomers employed;

c. Charging to the polymerization reaction product of step (b) a conjugated diene monomer containing from about 4–12 carbon atoms per molecule and polymerizing to essential completion said diene monomer in the presence of said reaction product to form a block copolymer, and wherein the amount of said diene monomer comprises from about 30–5 weight percent of the total weight of said branched block copolymer based upon the total weight of all of the monomers employed; and d. Charging to the polymerization reaction product of step (c) a polyfunctional treating agent capable of reacting with terminal lithium atoms on a preformed polymer to form a branched polymer wherein said polyfunctional treating agent is employed in an amount to provide from about 0.05–2 equivalents of said polyfunctional treating agent per gram atom of lithium employed in said polymerization process.

The coupling agent to be used in producing the polymers utilized in the practice of this invention, as noted hereinabove, must contain at least two, preferably three, reactive sites and is generally of the type which will result in an O—Li bond. Exemplary reaction sites and the resulting postulated reaction with the polymer lithium chains from the polymerization reaction are shown hereinbelow wherein one of the reactive groups is shown, it being understood that the coupling agent molecule will have at least two, preferably three or more, of these groups. This group is shown reacting with the polymer lithium chains, with the polymer being represented by the character R. The R' groups on the coupling agent are preferably hydrogen although they may also be 1–8 carbon atom hydrocarbon radicals. The R'' groups can be either hydrogen or 1–20 carbon atom hydrocarbon radicals. Applicants, of course, do not wish to be bound by theory but as noted hereinabove, the following reactions are postulated to represent the reactions taking place.

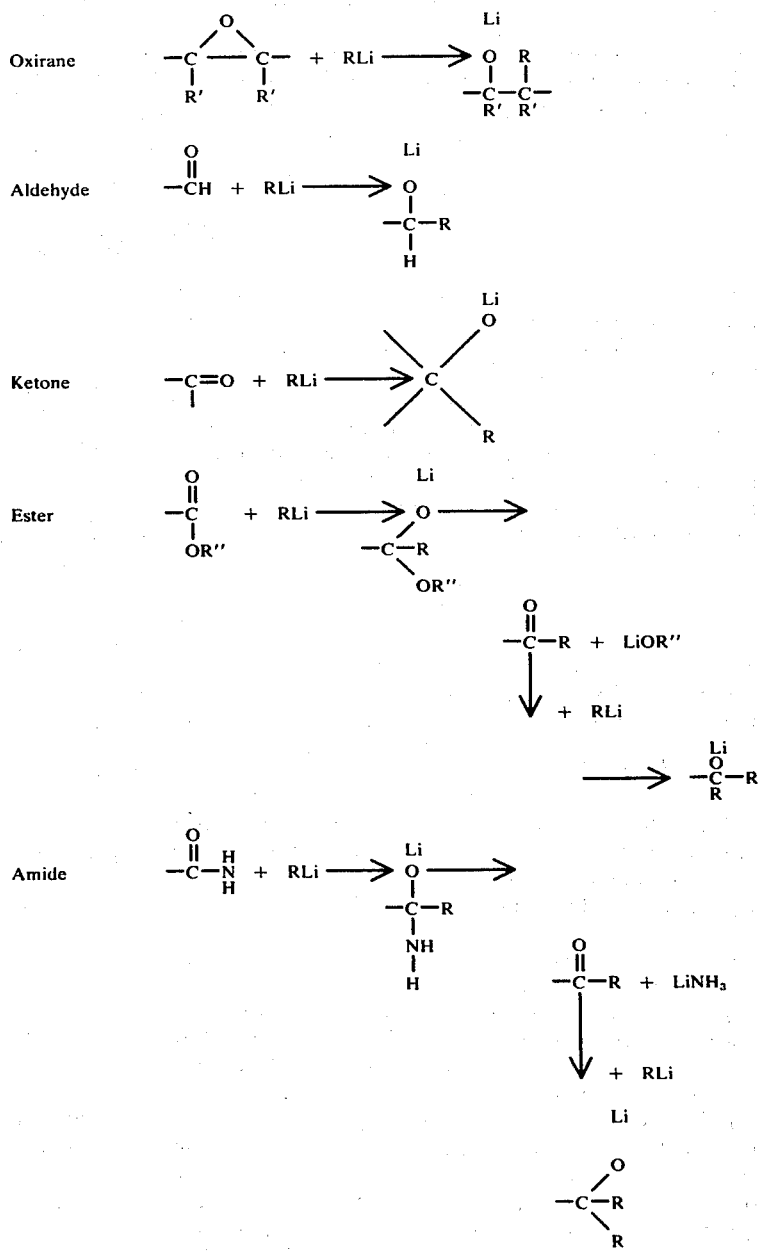

The instant invention can also be practiced on polymers produced using coupling agents which give reactions closely analogous to that of those described hereinabove so long as there is not produced a C—Li bond. Exemplary of these additional embodiments of the coupling agent are shown in the postulated reactions hereinbelow.

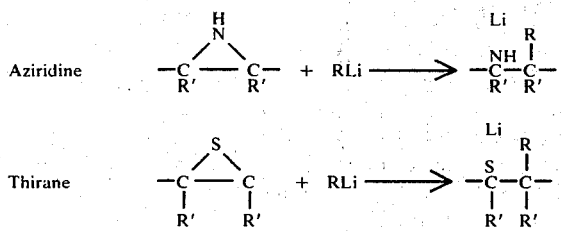

It is within the scope of the invention to use the carbon dioxide and water treatment in any coupled polymerization effluent containing —OLi groups (or the analogous —NHLi or —SLi) whether attached to the polymer molecule through the coupling agent or to a 1–20 carbon atom radical from the coupling agent. For example, the living polymer molecule can be terminated with a tetraalkoxy silane, trialkoxy silane, alkyl silane or the like to give a radial polymer and lithium alkoxide as shown in the postulated reactions hereinbelow where R''' is a hydrocarbon radical of 1–20 carbon atoms.

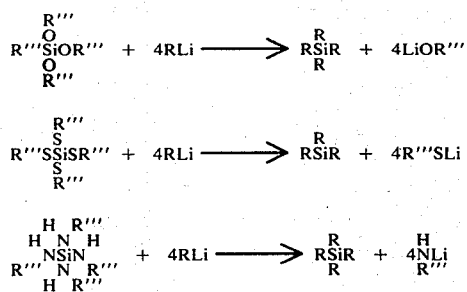

Broadly included within the scope of these agents is any compound having at least two, preferably at least three, of the —OR''', —SR''' or

groups attached to a silicon atom.

Most preferably, the coupling agent is an epoxidized unsaturated oil such as epoxidized soybean oil, epoxidized linseed oil and the like. Exemplary of such materials is the epoxidized linseed oil sold by Swift and Company under the trade name Epoxol 9-5. Also suitable is epoxidized polybutadiene. This designation means that the material has approximately 9 weight percent oxirane oxygen with approximately 5 epoxy groups per molecule. Actually the material has an average of about 5.5. The formula hereinbelow depicts a theoretical average molecule having six epoxy groups with a molecular weight of 980.

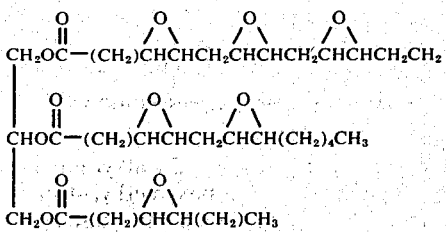

The carbon dioxide and water can be added at the same time from separate streams or together in a combined stream or separately. It is preferred to add the water first with sufficient agitation to disperse same so that carbonic acid can form in situ on addition of the carbon dioxide.

Preferably, the carbon dioxide will be added in approximately the theoretical amount necessary to react with the lithium. Of course, this could vary some with a range of 0.8 to 2 times the stoichiometric amount of the carbon dioxide generally being used. Preferably, at least a stoichiometric amount of carbon dioxide based on lithium is used. It is essential to utilize an excess of water. Generally, the mol ratio of water to carbon dioxide will be in the range of about 10:1 to about 500:1, preferably about 25:1 to about 250:1.

The treating time will generally be in the range of 0.01 to 100, preferably 1 to 10, minutes. Actually, the time is more a function of mixing efficiency with the reaction being essentially instantaneous after contact; however, continued contact does not seem to harm the process.

This treatment with carbon dioxide and water and the incorporation of antioxidants will be described hereinbelow. It is generally carried out in a mixing vessel just prior to introduction of the material into a devolatilizing extruder. Thus, the coupled polymer can be introduced into this mixing vessel and thereafter transferred to the devolatilizing extruder. The antioxidants can be added at any point but are preferably added to the mixing vessel just after the introduction of the carbon dioxide and water.

The organic phosphite used in this invention is represented by the formula:

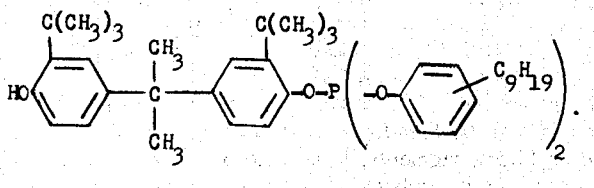

An example is: 2-t-butyl-α-(3-t-butyl-4-hydroxyphenyl)-p-cumenyl bis(p-nonylphenyl) phosphite.

The glycine used in accordance with this invention has the formula:

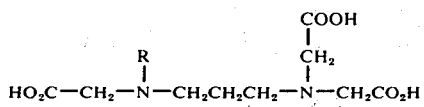

wherein R is either a $C_{14}$, $C_{16}$, or $C_{18}$ alkyl group. An example is: N-octadecyl-N'-(carboxymethyl)-trimethylene diglycine. These compounds are disclosed in 21.2566 *Federal Register*, Dec. 20, 1969, 34 F.R. 9972, subpart F — Food Additives — pages 62 and 2.1, respectively. The glycine will be present in an amount within the range of 1 to 50, preferably 25 to 37 weight percent based on the weight of the phosphite. The total amount of phosphite and glycine in the polymer will be within the range of 0.2 to 5, preferably 0.5 to 2, weight percent of this mixture based on the weight of polymer.

The third component of the stabilizer system is a sterically hindered phenol as described in Drake U.S. Pat. No. 3,629,372, the disclosure of which is hereby incorporated by reference. A presently preferred compound is 2,6-di-t-butyl-4-methylphenol, commonly referred to as BHT. This material will be present in the range of 0.05 to 5, preferably 0.1 to 1, weight percent based on the weight of the polymer.

After treatment in accordance with the invention, the polymers can be blended with conventional additives such as fillers, pigments, other antioxidants, and the like. The resulting polymers treated in accordance with the invention have particular utility in the production of fabricated items such as injection molded bowls and the like where improved optical properties are of aesthetic value and the improved thermal stability facilitates the molding operation.

EXAMPLE I

Polymer was made in accordance with the following recipe and charge order using the conditions disclosed in said Hogan et al patent. The styrene was added in a single addition.

Table I

| | | |
|---|---|---|
| Cyclohexane | 15.4 | pounds |
| Tetrahydrofuran | 0.75 | gram |
| Styrene monomer | 2280 | grams |
| n-Butyllithium | 3 to 3.9 | grams |
| Butadiene monomer | 720 | grams |
| Epoxidized soybean oil coupling agent | 15 | grams |

The resulting polymer was then treated with carbon dioxide and water in the amounts indicated in Table II. The indicated antioxidant systems were then added, the solvent removed and the polymer milled at 300° F. for 10 minutes before being evaluated. The results are shown hereinbelow in Table II.

Table II

| Run | $H_2O$ Phm[1] | $CO_2$, Phm | Molar Ratio $H_2O/CO_2$ | Melt Flow (200 C) | Percent Melt Flow Change at 230 C | |
|---|---|---|---|---|---|---|
| | | | | | 5 vs. 30 min. | 5 vs. 40 min. |
| Antioxidants: Geltrol[2], 1.35 Phm/BHT[3], 0.25 Phm | | | | | | |
| 1 | 0.2 | 0.1 | 4.9/1 | 5.0 | (−) 10.5 | (−) 6.3 |
| 2 | 1.2 | 0.1 | 29/1 | 4.7 | (+) 5.5 | (+) 3.2 |
| 3 | 1.2 | 0.1 | 29/1 | 5.5 | (+) 5.7 | (+) 0.5 |
| 4 | 7.2 | 0.1 | 177/1 | 5.7 | (+) 9.2 | (+) 14.3 |
| Antioxidants: TNPP[4], 1.50 Phm/BHT, 0.50 Phm | | | | | | |
| 5 | 0.2 | 0.1 | 4.9/1 | 5.9 | (−) 10.9 | (−) 19.3 |
| 6 | 7.2 | 0.1 | 177/1 | 6.6 | (−) 23.2 | — |

[1]Parts per 100 parts of monomer which is roughly equivalent to weight percent based on polymer.
[2]Commercial mixture available from Vanderbilt containing a mixture of

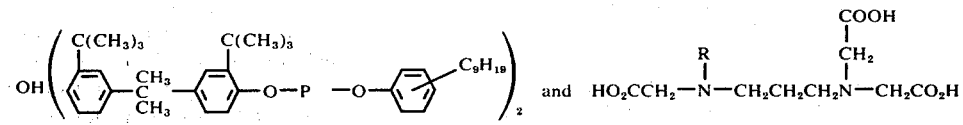

wherein R is a $C_{14}$, $C_{16}$ or $C_{18}$ alkyl and wherein said glycine is present in an amount of about 25 to 37 weight percent based on the total weight of the glycine and phosphite.
[3]BHT is 2,6-di-tert-butyl-4-methylphenol.
[4]Tris-nonylphenyl phosphite.

As can be seen the polymer exhibited substantial instability (as evidenced by melt flow decrease) at a ratio of water to $CO_2$ of 4.9/1. This was true both using the phosphite-glycine stabilizer of Run 1 and the tris-nonylphenyl phosphite of Run 5. Run 6 shows that addition of excess water to the system containing the tris-nonylphenyl phosphite did not effect any improvement. However, as Runs 2 to 4 demonstrate, excess water in the systems containing the phosphite-glycine were greatly improved in stability, as evidenced by the elimination of melt flow drop off.

EXAMPLE II

In this example similar polymer to that of Example I was treated in a similar manner with the polymer also being evaluated for spiral flow stability. This test determines the stability in terms of the number of shots which can be made in an injection molding machine before the polymer turns hazy. The higher the number the better the stability.

TABLE III

| Run | H₂O, phm | Molar Ratio H₂O/CO₂ | Melt Flow | % M. F. Change* 230 C 5 vs. 40 min. | % M. F. Change* 250 C 5 vs. 30 min. | Spiral Flow Stability Shot of Haze Dev. at: 450 F | Spiral Flow Stability Shot of Haze Dev. at: 475 F |
|---|---|---|---|---|---|---|---|
| | | Section A - Antioxidants: Geltrol, 1.5 phm/BHT, 0.5 phm | | | | | |
| 7 | 0.2 | 4.9/1 | 6.0 | (+) 12 | (−) 32 | 18 | — |
| 8 | 10.2 | 246/1 | 5.9 | (+) 9 | (−) 6 | 30 | — |
| 9 | 7.2 | 177/1 | 5.8 | (+) 1 | (−) 2 | 30 | 15 |
| | | Section B - Antioxidants: Geltrol, 1.35 phm/BHT, 0.25 phm | | | | | |
| 10 | 0.2 | 4.9/1 | 6.2 | (−) 0.5 | (−) 42 | 17 | 8 |
| 11 | 0.2 | 4.9/1 | 5.3 | (−) 6 | (−) 61 | 13 | — |
| 12 | 7.2 | 177/1 | 5.9 | (+) 14 | (−) 4 | 25 | — |
| 13 | 7.2 | 177/1 | 6.1 | (+) 9 | (−) 7 | 22 | — |
| 14 | 7.2 | 177/1 | 7.0 | (+) 12 | (−) 29 | 22 | 13 |
| 15 | 2.0 | 49/1 | 6.3 | (+) 6 | (−) 28 | 20 | — |
| 16 | 1.2 | 29/1 | 6.4 | (−) 6 | (−) 31 | 18 | 8 |
| | | Section C - Antioxidants: TNPP, 1.5 phm/BHT, 0.5 phm | | 5 vs. 20 min. | | | |
| 17 | 0.2 | 4.9/1 | 5.1 | (−) 19 | (−) 40 | 18 | — |
| 18 | 7.2 | 177/1 | 6.9 | (−) 23 | (−) 74 | 14 | — |

*Samples milled at 280 F for 10 minutes before testing.

As in Example I, Runs 7, 10, 11 and 17 show that the polymer exhibits severe melt flow drop off and only moderate stability in the spiral flow test. Runs 8, 9 and 12 to 15 show the dramatic improvement as a result of utilizing excess water in the systems utilizing the phosphite-glycine stabilizer system. Run 16 shows a slight improvement. Run 18 shows that with the tris-nonylphenyl phosphite the excess water does not effect any improvement.

While this invention has been described in detail for the purpose of illustration, it is not to be construed as limited thereby but is intended to cover all changes and modifications within the spirit and scope thereof.

We claim:

1. A method comprising: adding carbon dioxide and water to a polymer containing effluent from a polymerization reaction wherein at least one monomer is contacted with an organolithium initiator and thereafter the resulting polymer molecules having an active lithium atom on one end are contacted with a coupling agent having at least two reactive groups, which coupling results in the generation of LiO—, LiS—, or LiNH— groups attached either to said coupling agent or to a 1 to 20 carbon atom radical from said coupling agent, said carbon dioxide being present in an amount within the range of 0.8 to 2 times the stoichiometric amount based on said lithium with said water and carbon dioxide being present in a molar ratio within the range of 10:1 to 500:1 mols of water per mol of carbon dioxide, said polymer being stabilized with 0.2 to 5 weight percent based on the weight of said polymer of a mixture of a phosphite having the formula

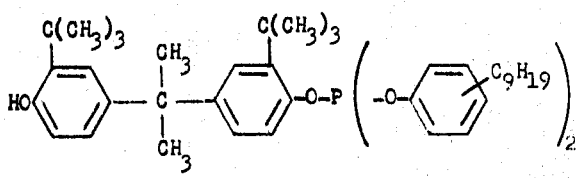

and a glycine having the formula

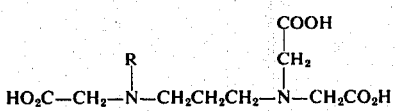

wherein R is a $C_{14}$, $C_{16}$ or $C_{18}$ alkyl radical and wherein said glycine is present in an amount within the range of 1 to 50 weight percent based on the weight of said phosphite, and 0.05 to 5 weight percent of a hindered phenol based on the weight of said polymer.

2. A method according to claim 1 wherein said ratio of water to carbon dioxide is within the range of 25:1 to 250:1.

3. A method according to claim 1 wherein said hindered phenol is 2,6-di-tert-butyl-4-methylphenol.

4. A method according to claim 3 wherein said mixture is present in an amount within the range of 0.5 to 2 weight percent based on the weight of said polymer and said 2,6-di-tert-butyl-4-methylphenol is present in an amount within the range of 0.1 to 1 weight percent based on the weight of said polymer.

5. A method according to claim 3 wherein said glycine is present in an amount within the range of 25 to 37 weight percent based on the weight of said phosphite.

6. A method according to claim 3 wherein said polymer is a polymer of butadiene and styrene.

7. A method according to claim 6 wherein said polymer is produced by the sequential addition of styrene and then butadiene, said styrene being present in an amount within the range of 70 to 95 weight percent so as to give a resinous polymer.

8. A method according to claim 1 wherein said phosphite is 2-t-butyl-α-(3-t-butyl-4-hydroxyphenyl)-p-cumenyl bis (p-nonylphenyl) phosphite.

9. A method according to claim 1 wherein said glycine is N-octadecyl-N'-(carboxymethyl)-trimethylene diglycine.

10. A method according to claim 9 wherein said phosphite is 2-t-butyl-α-(3-t-butyl-4-hydroxyphenyl)-p-cumenyl bis (p-nonylphenyl) phosphite.

* * * * *